(12) United States Patent
Noto et al.

(10) Patent No.: US 7,359,547 B2
(45) Date of Patent: Apr. 15, 2008

(54) PSEUDO THREE DIMENSIONAL IMAGE GENERATING APPARATUS

(75) Inventors: Hajime Noto, Hachiooji (JP); Yasuo Ishigure, Tokorozawa (JP); Akihiko Hashimoto, Koganei (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 771 days.

(21) Appl. No.: 10/663,730

(22) Filed: Sep. 17, 2003

(65) Prior Publication Data

US 2004/0057613 A1 Mar. 25, 2004

(30) Foreign Application Priority Data

Sep. 20, 2002 (JP) ............................. 2002-275471

(51) Int. Cl.
*G06K 9/00* (2006.01)
(52) U.S. Cl. ...................... 382/152; 382/154; 382/270; 396/60; 396/89; 345/419
(58) Field of Classification Search ................ 382/152, 382/154, 254, 285, 312, 252, 270; 345/5–10, 345/426–427, 419, 605, 611, 473, 952, 428; 348/586, 590, 592; 358/3.24, 462; 324/309; 355/40; 367/50; 396/60, 89
See application file for complete search history.

(56) References Cited

U.S. PATENT DOCUMENTS

| | | | | |
|---|---|---|---|---|
| 5,883,933 A | * | 3/1999 | Goto et al. | 378/62 |
| 5,923,380 A | * | 7/1999 | Yang et al. | 348/586 |
| 6,100,895 A | * | 8/2000 | Miura et al. | 345/426 |
| 6,223,149 B1 | * | 4/2001 | Margulis et al. | 703/27 |
| 6,646,623 B1 | * | 11/2003 | Chakrabarti | 345/6 |
| 7,027,659 B1 | * | 4/2006 | Thomas | 382/254 |

FOREIGN PATENT DOCUMENTS

| | | |
|---|---|---|
| JP | 2-79179 | 3/1990 |
| JP | 11-134505 | 5/1999 |
| JP | 2000-121339 | 4/2000 |
| JP | 2000-146543 | 5/2000 |
| JP | 2000-329524 | 11/2000 |
| JP | 2002-133400 | 5/2002 |
| JP | 2002-358519 | 12/2002 |

OTHER PUBLICATIONS

Marc Bastuscheck technique for real time generation of range images IEEE 1989.*

(Continued)

*Primary Examiner*—Sheela Chawan
(74) *Attorney, Agent, or Firm*—Oblon, Spivak, McClelland, Maier & Neustadt, P.C.

(57) ABSTRACT

The pseudo depth information of a subject is generated from multiple images of the subject captured with and without illumination or under various illumination intensities. A pseudo 3D image generating apparatus generates a pseudo 3D image. It includes an image storing unit that stores the images, and a depth computing unit that computes pseudo depth values of the subject based on operations between the pixel values of corresponding pixels in the images. A compact and handy 3D image generating apparatus is provided.

17 Claims, 14 Drawing Sheets

OTHER PUBLICATIONS

C. Marc Bastuscheck, "Techniques for Real-time Generation of Range Images", IEEE Computer Society Conference, XP-010016459, Jun. 4, 1989, pp. 262-268.

C. Marc Bastuscheck, et al., "Object Recognition by Three-Dimensional Curve Matching", International Journal of Intelligent Systems, vol. 1, XP-009047871, 1986, pp. 105-132.

Brian Carrihill, et al., "Experiments with the Intensity Ratio Depth Sensor", Computer Vision, Graphics and Image Processing, vol. 32, XP-009047858, 1985, pp. 337-358.

Jose R. A. Torreao, "A New Approach to Photometric Stereo", ELSEVIER, Pattern Recognition Letters, vol. 20, No. 5, XP-004169879, May 1999, pp. 535-540.

* cited by examiner

FIG.12

| 1/49 | 1/49 | 1/49 | 1/49 | 1/49 | 1/49 | 1/49 |
|------|------|------|------|------|------|------|
| 1/49 | 1/49 | 1/49 | 1/49 | 1/49 | 1/49 | 1/49 |
| 1/49 | 1/49 | 1/49 | 1/49 | 1/49 | 1/49 | 1/49 |
| 1/49 | 1/49 | 1/49 | 1/49 | 1/49 | 1/49 | 1/49 |
| 1/49 | 1/49 | 1/49 | 1/49 | 1/49 | 1/49 | 1/49 |
| 1/49 | 1/49 | 1/49 | 1/49 | 1/49 | 1/49 | 1/49 |
| 1/49 | 1/49 | 1/49 | 1/49 | 1/49 | 1/49 | 1/49 |

PSEUDO THREE DIMENSIONAL IMAGE GENERATING APPARATUS

BACKGROUND OF THE INVENTION

1. Field of the Invention

The present invention generally relates to an image generating apparatus, and more particularly, to an image generating apparatus for, a method of, and a computer program for generating a pseudo three dimensional image from a plurality of images, and a computer readable recording medium storing the program.

2. Description of the Related Art

There are various conventional methods of three dimensional measurement. The methods of three dimensional measurement are generally divided into two categories: passive methods and active methods. The stereo method is a typical passive method, and the light sectioning method is a typical active method.

In the stereo method, images of a subject are captured using two image capturing apparatuses disposed at a certain distance. The position of the subject is determined using optical triangulation based on the difference of the projected positions of the subject in the images captured by the two image capturing apparatuses. In the light sectioning method, images of a subject are captured using a slit projection apparatus and an image capturing apparatus disposed at a certain distance. The position of the subject is determined using optical triangulation based on the position in the captured image of a slit light projected on the subject.

Japanese Laid-open Patent Application No. 2000-329524 discloses a technique in which the depth of a subject is determined using optical triangulation by illuminating the subject with light of which intensity changes position by position on the subject (light of which intensity increases from left to the right, for example) and measuring reflective light of each position's light intensity. This technique, however, requires positioning the image capturing apparatus and the illuminating apparatus at a certain distance. It is difficult to embody this technique as a compact 3D image generating apparatus.

Japanese Laid-open Patent Application No. 2000-121339 discloses another technique, in which there is a certain distance between a subject and an image capturing apparatus, using the so-called "time of flight" principle by illuminating the subject with light of which intensity changes over time and measuring the intensity of reflective light. This technique, however, requires a special illuminating apparatus that illuminates the subject with intensity modulated light and an image capturing apparatus equipped with a high-speed shutter for capturing the change in the intensity modulated light. It is difficult to embody this technique as a low cost 3D image generating apparatus.

Japanese Laid-open Patent Application No. 2-079179 discloses a technique in which pseudo depth values are computed using tomograms captured with an X-ray CT, for example, each tomogram corresponding to a discrete depth value, in a manner where a transparent image is smoothly connected to an adjacent divisional image. This technique, however, requires transparent images that are captured by an X-ray CT, for example, and are divided into tomograms each corresponding to a discrete depth value. It is difficult to embody this technique as a general purpose 3D image generating apparatus other than a medical apparatus.

Recently and continuing, mobile terminals equipped with a camera are being popularized. Although images captured by such a camera are two dimensional, three dimensional images, if available, expand the application of images and increase the use of images. Since the conventional methods, both the passive methods and the active methods, use optical triangulation, an image capturing apparatus and a slit projection apparatus, for example, need to be disposed at a certain distance. It is difficult to apply the conventional methods to mobile terminals. Additionally, the passive method generally requires a short measurement time, but results in low accuracy and low quality 3D images. The active method generally results in high accuracy, but requires a long measurement time. The active method is better applied to an industrial apparatus. Since the other methods described above also require special apparatuses, they are useful only for limited purposes.

SUMMARY OF THE INVENTION

Accordingly, it is a general object of the present invention to provide a novel and useful image generating apparatus. Another and more specific object of the present invention is to provide a compact and easy-to-use pseudo three dimensional image generating apparatus and a method of generating a pseudo three dimensional image applicable to the compact and easy-to-use pseudo three dimensional image generating apparatus.

The term "pseudo depth" indicates a depth (distance) that, in the case where the actual distance of a subject is unknown, is reasonably determined and assigned to the subject as described below, instead of its actual depth. The term "pseudo 3D image" indicates a three dimensional image of which depth is the pseudo depth.

A pseudo 3D image generating apparatus, according to the present invention, generates a pseudo three dimensional image of a subject from a plurality of images captured in various illumination conditions. The pseudo 3D image generating apparatus includes: an image storing unit that stores the images, and a depth computing unit that computes pseudo depth value of a pixel in one of the images stored in said image storing unit based on an operation using the pixel value of said pixel and the pixel value of another pixel in another one of the images stored in said image storing unit, said other pixel corresponding to said pixel.

A plurality of images of a subject captured under various illumination conditions are input to the pseudo 3D image generating apparatus. The images are compared thereby to compute the depth value of pixels. The various illumination conditions may be the case in which the subject is illuminated by an illuminating apparatus and the case in which the subject is not illuminated by the illuminating apparatus. The greater the difference between images in the two cases is, the closer to the image capturing apparatus the subject is. Although the depth value is discrete, one can generate a pseudo 3D image with discrete depths. The discrete depth value may be replaced with a continuous function so that the discrete depth values are smoothly connected. Accordingly, the pseudo 3D image generating apparatus can avoid a "cardboard" effect and make observers perceive the generated pseudo 3D image as being natural and of high quality.

Other objects, features, and advantages of the present invention will become more apparent from the following detailed description when read in conjunction with the accompanying drawings.

BRIEF DESCRIPTION OF THE DRAWINGS

FIG. 12 is an example of the results of a smoothing filter according to the fifth embodiment;

DETAILED DESCRIPTION OF THE PREFERRED EMBODIMENTS

The preferred embodiments of the present invention are described below in detail with reference to the drawings.

First Embodiment

Figure 1:
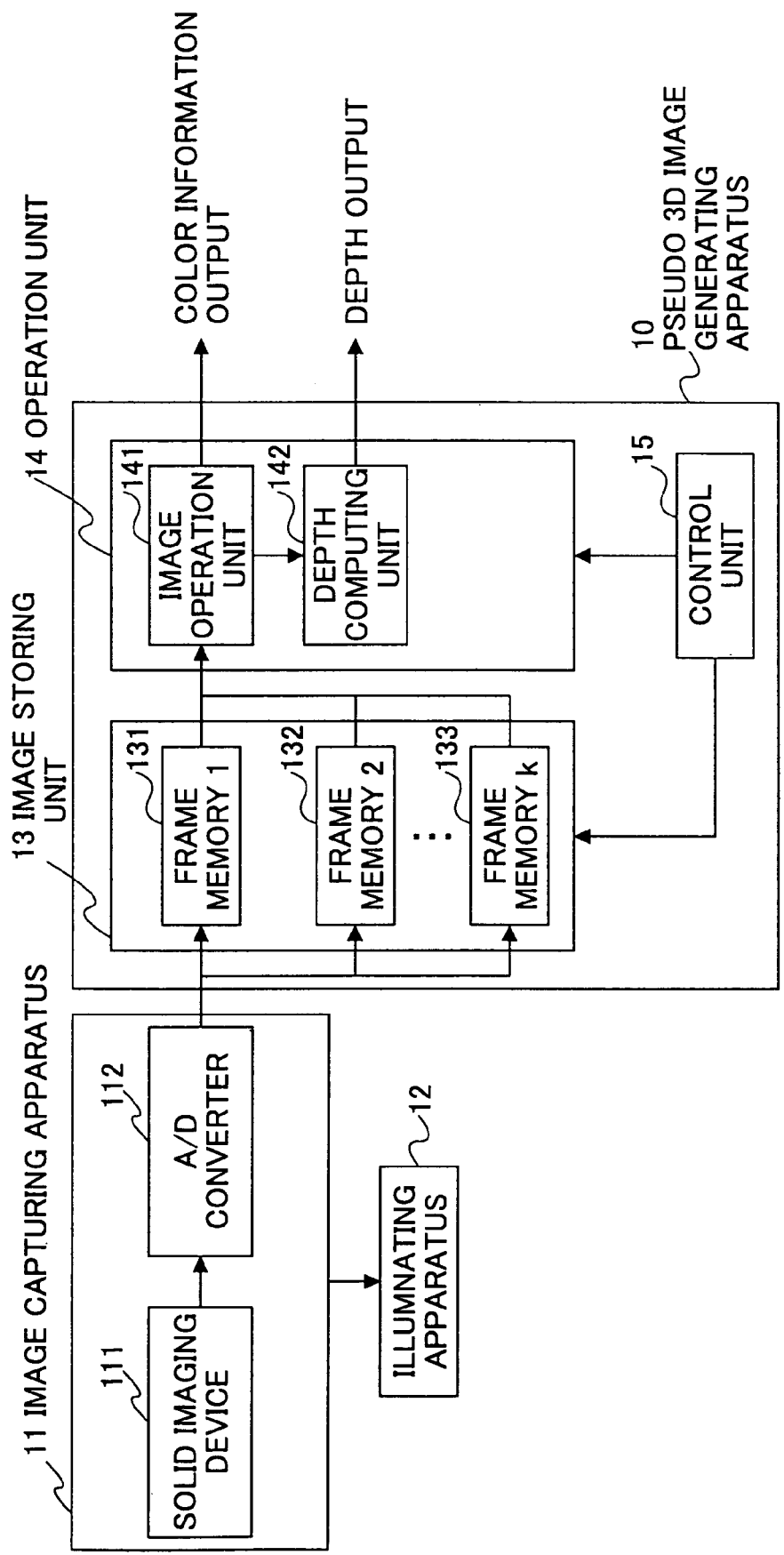
FIG. 1 is a block diagram showing a pseudo three dimensional image generating apparatus according to a first embodiment of the present invention.

FIG. 1 is a block diagram showing a pseudo three dimensional (3D) image generating apparatus according to a first embodiment. The pseudo 3D image generating apparatus 10 shown in FIG. 1 is connected to an image capturing apparatus 11 equipped with or connected to an illuminating apparatus 12 that illuminates a subject of which images are to be captured. The pseudo 3D image generating apparatus 10 is provided with an image storing unit 13, an operation unit 14, and a control unit 15. The image storing unit 13 stores the image data of the subject. The operation unit 14 computes pseudo depth of the subject by comparing a plurality of images captured in various illumination conditions with different intensities of illumination. The control unit 15 controls the above units.

Figure 2:
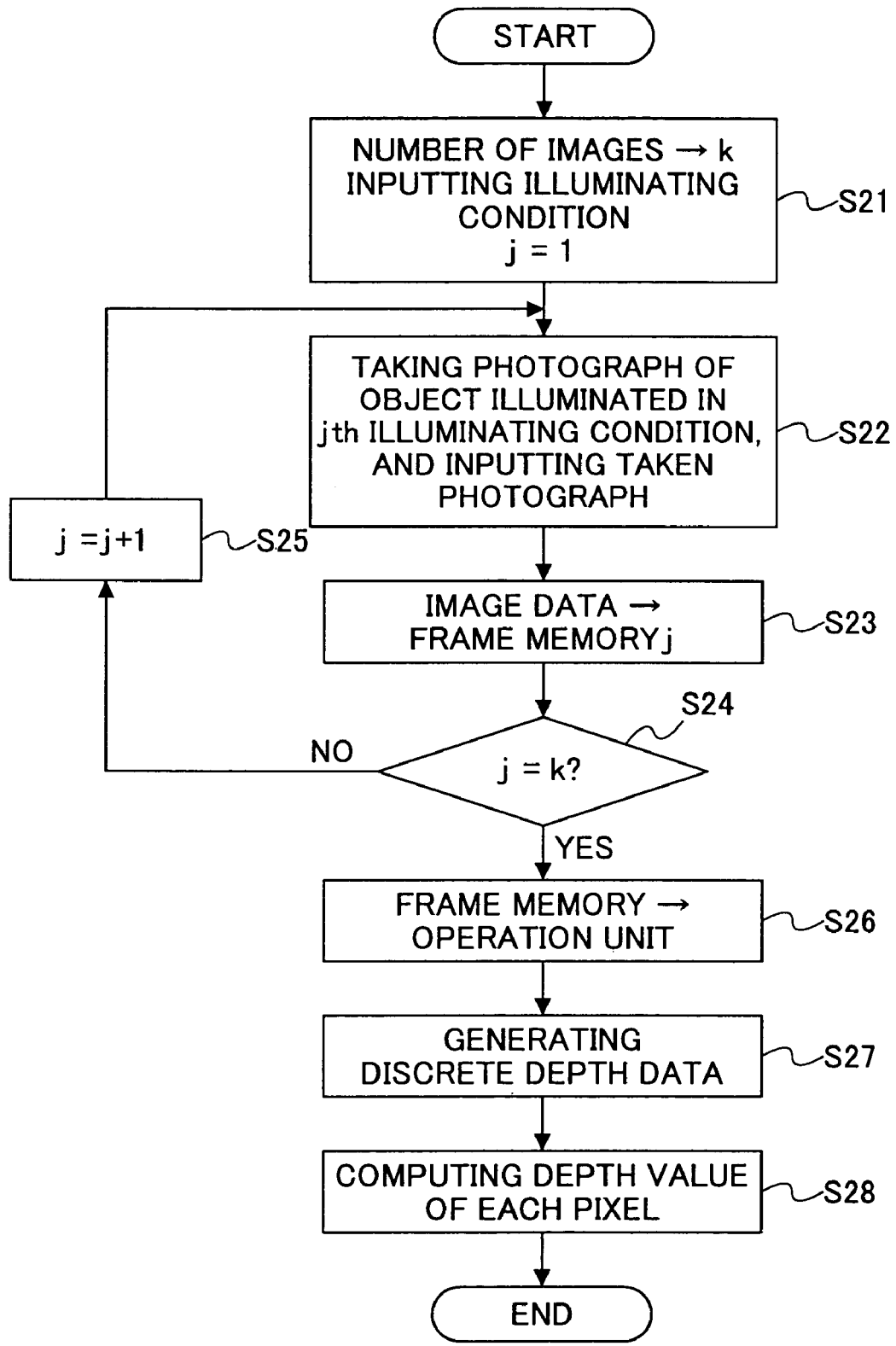
FIG. 2 is a flow chart showing processing for generating a pseudo three dimensional image according to the first embodiment.

FIG. 2 is a flow chart for explaining a method of generating a pseudo 3D image that is executed by the pseudo 3D image generating apparatus 10 showing in FIG. 1. The operation of the pseudo 3D image generating apparatus 10 is described with reference to the flow chart of the method of generating a pseudo 3D image shown in FIG. 2.

When generating a pseudo 3D image of a subject, illumination conditions and the number k of images to be captured are input (step S21). The illumination conditions and the number k of images may be fixed beforehand. The subject is illuminated in the j-th illumination condition with the illuminating apparatus 12, and an image captured by the image capturing apparatus 11 is input (step S22). The intensity of illumination differs in each illumination condition. The illuminating apparatus 12 illuminates the subject in response to an illumination signal (a pulse in synchronization with the shutter of the image capturing apparatus, for example). An image signal captured in the j-th order is stored in a frame memory j provided in the image storing unit 13 as image data (step S23). Processing of steps S22 and S23 is repeated until the number of captured image reaches the number k (step S24, S25).

After images are completely input, the stored image data are transferred from the frame memory 131-133 to the image operation unit 141 of the operation unit 14 in response to an instruction of the control unit 15 (step S26). The image operation unit 141 generates discrete depth data based on the images captured under different illumination conditions by performing operations (subtractions and/or divisions, for example) between the pixel values of corresponding pixels and comparing the result of the operations with a predetermined threshold value (step S27). A detailed description is given of the discrete depth data below.

The image operation unit 141 performs preprocessing for generating color information among the images and for computing depth values. The color information is generated, for example, by converting the images so that the contrast of each image becomes the maximum and extracting the image of the highest contrast. The converted images may be appropriately weighted and combined. The pre-processing may include edge detection, object detection by color, and expansion and shrinkage after binarization, for example. A combination of the above processing methods may be selected by the control unit 15.

The depth computing unit 142 computes a pseudo depth value of each pixel using the discrete depth data generated by the image operation unit 141 (step S28).

Illuminating the subject is required for computing the depth value of the subject. The image capturing apparatus 11 and the illuminating apparatus 12 may be disposed side by side. Accordingly, the pseudo 3D image generating apparatus 10 may become more compact than conventional apparatuses. The pseudo 3D image generating apparatus 10 may be built into a mobile terminal, a notebook computer, and a digital camera, for example.

Figure 3:
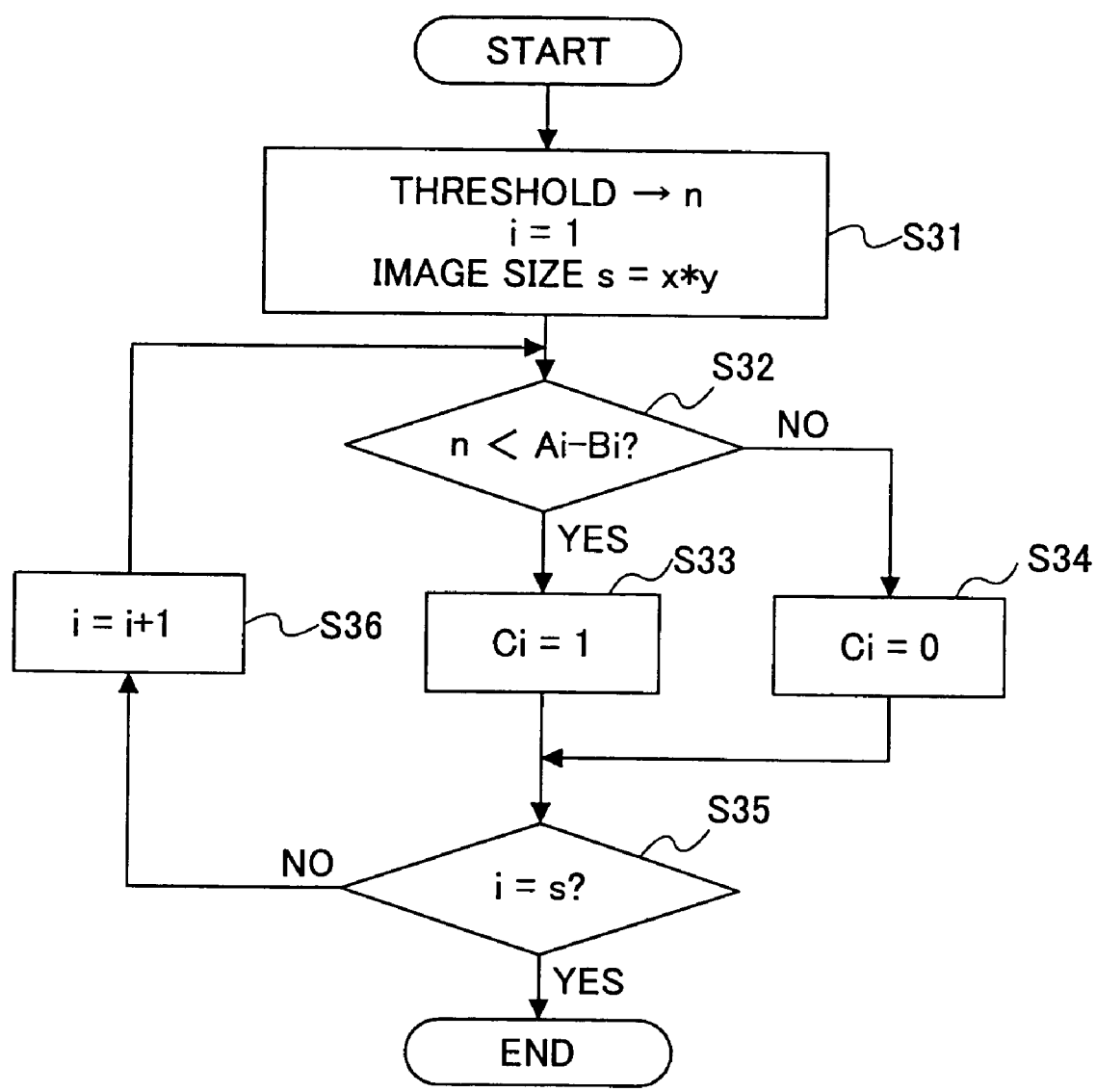
FIG. 3 is a flow chart showing a step of generating discrete depth data according to the first embodiment.

FIG. 3 is a flow chart showing the step of generating the discrete depth data (step S27) shown in FIG. 2. In this embodiment, the depth value is assumed to be binary in order to make the description easy. Two illumination conditions, that is, "with illumination" and "without illumination" are set, and two images are captured. The pixel value of i-th pixel of the image data captured "with illumination" is denoted as $A_i$, and the pixel value of i-th pixel of the image data captured "without illumination" is denoted as $B_i$. Binary data qualitatively indicating the discrete depth is denoted as $C_i$.

When computing a depth value, a threshold n and the image size s are determined (step S31). The threshold n is a parameter that divides pixels of the image into two categories, that is, pixels close to and pixels distant from the image capturing apparatus 11. The threshold n is arbitrary determinable. The determination of the threshold n is described below. The image size s is the number of pixels in the width directions (x) multiplied by the number of pixels in the height directions (y) of the input image data. The pixel value $B_i$ is subtracted from the pixel value $A_i$. If the result of the subtraction is equal to or greater than the threshold n, then Ci is set equal to 1. If not, Ci is set equal to 0 (steps S32-S34). Processing of steps S32-S34 is repeated for all the pixels of the image data (steps S35-S36)

Pixels of which the value of the binary discrete depth data Ci is 1 are determined to be close to the image capturing apparatus 11. The other pixels are determined to be distant from the image capturing apparatus 11. As described above, the binary data Ci indicates the discrete depth of pixels qualitatively based on the comparison with the threshold n. A pseudo 3D image can be generated at high speed without excessive computational load by using the result of binary processing as the pseudo depth value.

Multi-level depth values may be computable by using binary processing based on a plurality of images captured under different illumination conditions or binary processing using different thresholds. In this case, one of the images is used as a reference image, and operations between each of the other images and the reference image may be performed.

Figure 4:
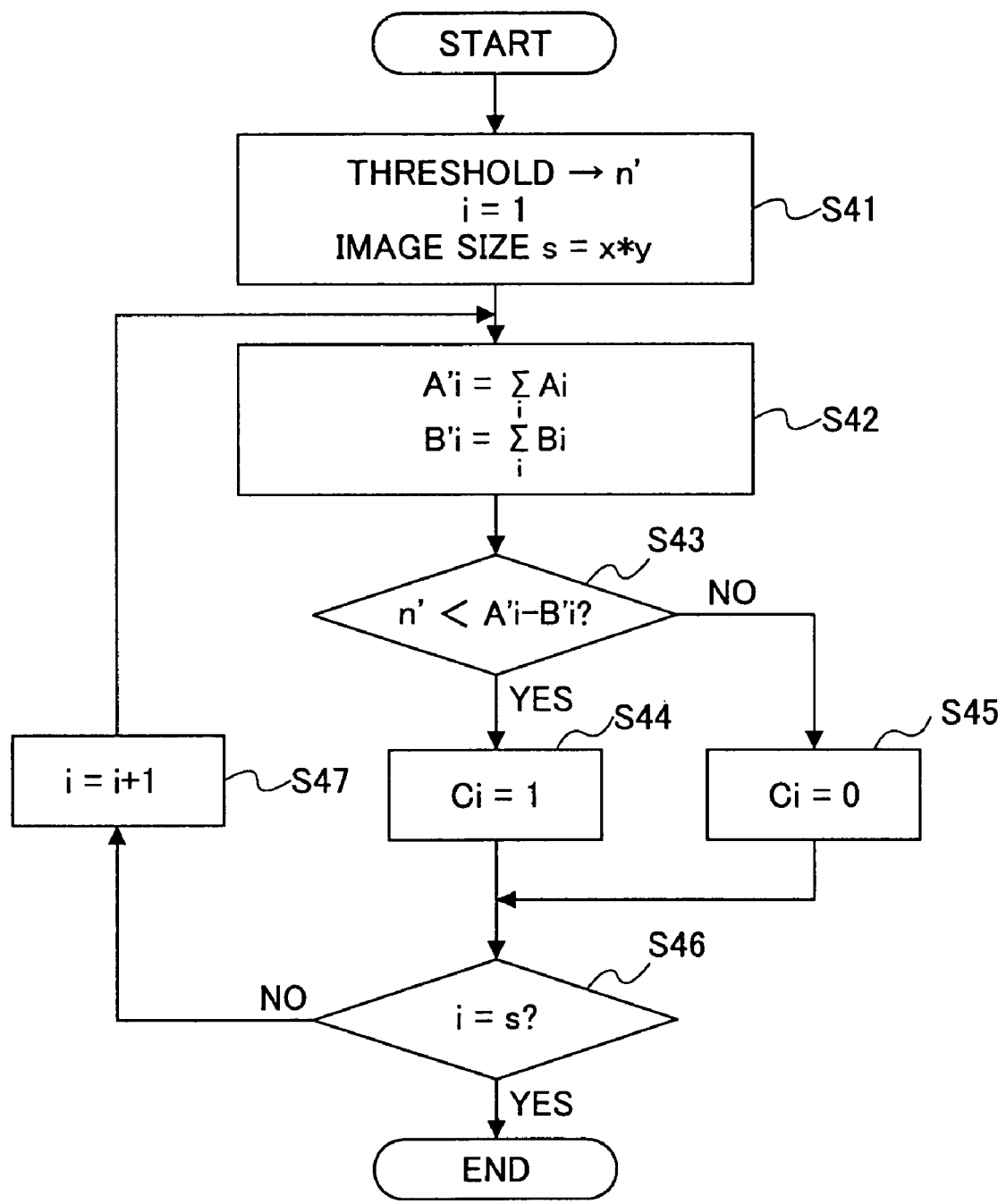
FIG. 4 is a flow chart showing the step shown in FIG. 3 in the case that average value is used.

FIG. 4 is a flow chart showing a variation of the step of generating the discrete depth data (step S27 in FIG. 2) described with reference to FIG. 3. The step of generating discrete depth data shown in FIG. 4 is different from the step of generating the discrete depth data shown in FIG. 3 in that, when the binary data Ci of a pixel i is computed, average values A'i and B'i of several pixels around the pixel i are used instead of the pixel values Ai and Bi, respectively. Since the average values are used, even if data of the plurality of images that are to be compared are deviated, the effect of the deviation can be reduced. If the range of pixels to be averaged is determined appropriately, the pseudo 3D image generating apparatus 10 is applicable to moving images too. Since the S/N ratio is improved by averaging, the results of operations and comparisons become stable.

Second Embodiment

A second embodiment of the present invention is described below. The pseudo 3D image generating apparatus and the method of generating a pseudo 3D image of the second embodiment are identical to those of the first embodiment except for the step of generating discrete depth data. Accordingly, only the difference is described below.

Figure 5:
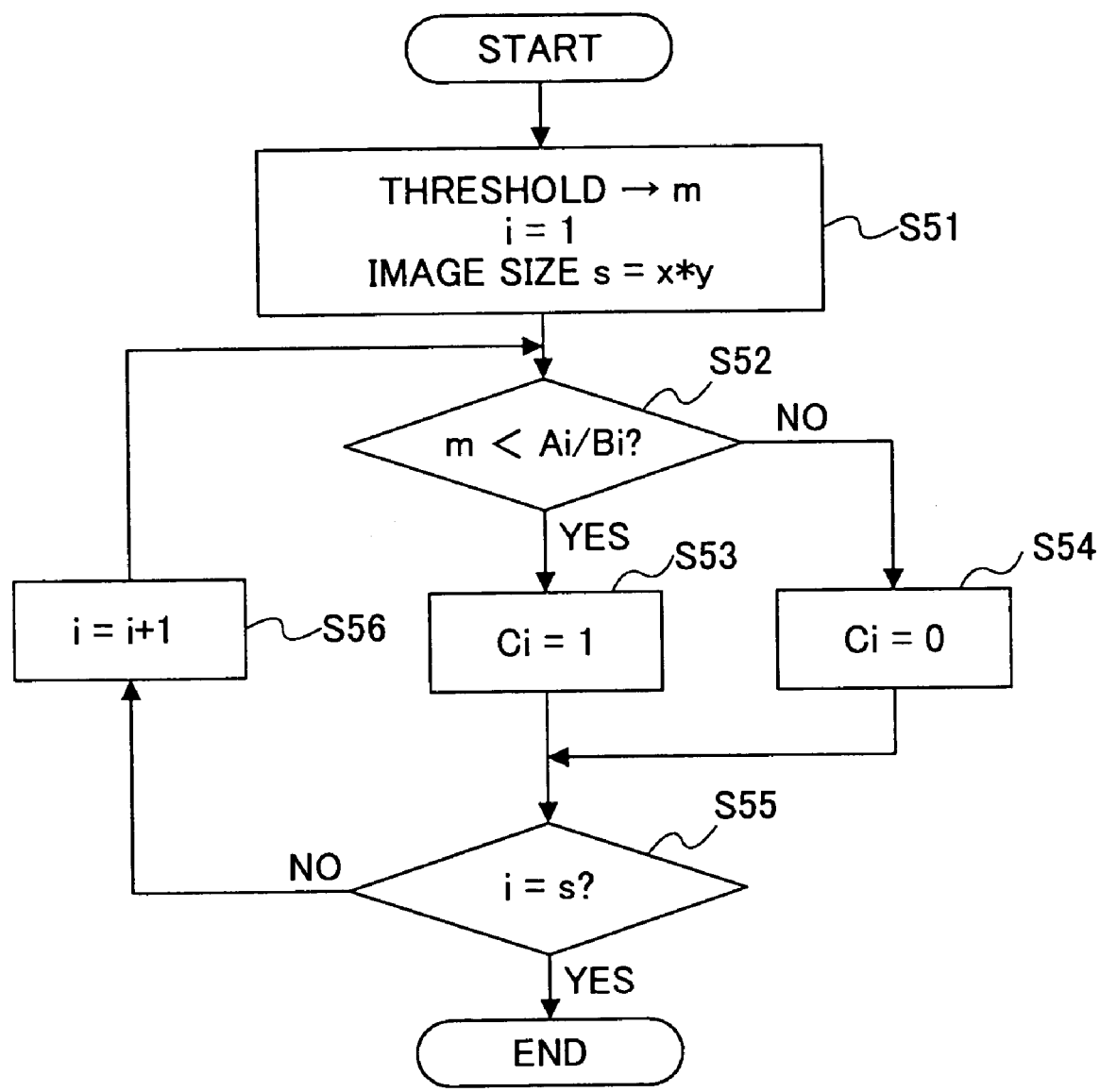
FIG. 5 is a flow chart showing a step of generating discrete depth data according to a second embodiment of the present invention.

FIG. 5 is a flow chart showing a process of generating discrete depth data according to the second embodiment. The depth value is assumed to be binary data indicating "close" and "distant" in the second embodiment. The pixel value of the i-th pixel of image data "with illumination" is denoted as Ai, the pixel value of the i-th pixel of image data "without illumination" is denoted as Bi, and binary data qualitatively indicating discrete depth is denoted as Ci.

When computing depth value, a threshold m and image size s are determined first (step S51). The threshold m is a parameter for assigning binary discrete depth data to an image. The threshold is arbitrarily determinable. The image size s is the number of pixels in the width direction (x) multiplied by the number of pixels in the height direction (y) of input image data. If the ratio of the pixel value Ai to the pixel value Bi is equal to or more than the threshold m, then Ci is set at 1, otherwise, Ci is set at 0 (steps S52-S54). Processing of steps S52-S54 is repeated for all the pixels of the image data (steps S55-S56).

Pixels of which binary data Ci is 1 are determined to be close to the image capturing apparatus 11, and the other pixels are determined to be distant from the image capturing apparatus 11.

As shown in FIG. 5, division of the pixel values Ai and Bi is used in the process of generating the discrete depth data according to the second embodiment. In a case that there are a plurality of subjects of which reflective indexes are different, if the discrete depth data Ci is determined based on the division of the pixel values Ai and Bi as it is determined in the second embodiment, the difference of reflective indexes does not affect the discrete depth data Ci. In such a case, if the discrete depth data Ci is determined based on the subtraction of the pixel values Ai and Bi as it is determined in the first embodiment, the difference in reflective index may affect the discrete depth data Ci. Because the reflective index differs subject by subject, a subject of high reflective index may be determined to be closer to the image capturing apparatus 11 than it actually is, and a subject of low reflective index may be determined to be more distant from the image capturing apparatus 11 than it actually is. However, this problem is negligible in many cases such as a far-and-near separation in which the distance to the subjects needs to be very coarsely measured.

Figure 6:
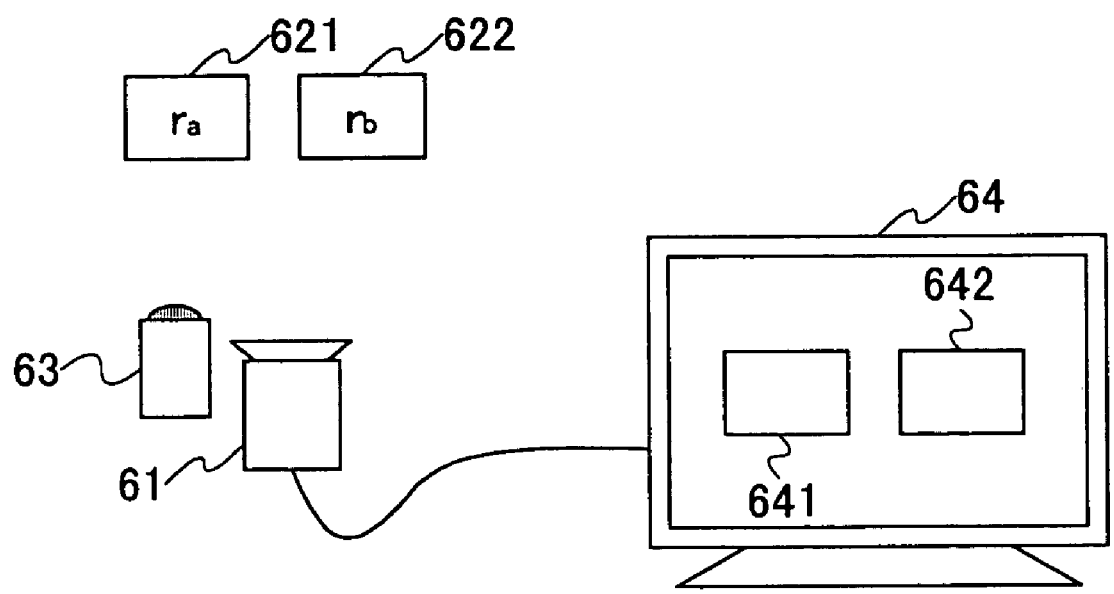
FIG. 6 is a schematic diagram for explaining the effect of reflective index of a subject on the discrete depth data.

FIG. 6 is a schematic diagram for explaining the effect on the discrete depth data Ci, of the difference in the reflective index of a plurality of subjects of different reflective indexes. As shown in FIG. 6, subjects 621 and 622 are equally distant from an image capturing apparatus 61 and an illuminating apparatus 63. The reflective indexes of the subjects 621 and 622 are $r_a$ and $r_b$, respectively, which are different from each other. When the image capturing apparatus 61 captures images of the subjects 621 and 622, the captured images are displayed on a display apparatus 64. Assuming that the light intensity that reaches the subjects 621 and 622 from the illumination apparatus 63 is X, the subjects 621 and 622 are displayed on the display apparatus 64 as objects 641 and 642 of which luminance is $r_a*X$ and $r_b*X$, respectively. Likewise, if the light intensity that reaches the subjects 621 and 622 from the illumination apparatus 63 is Y, the subjects 621 and 622 are displayed on the display apparatus 64 as objects 641 and 642 of which luminance is $r_a*Y$ and $r_b*Y$, respectively. The difference in luminance of the subject 621 is $r_a*(X-Y)$, and the difference in luminance of the subject 622 is $r_b*(X-Y)$. Although the subjects 621 and 622 are equally distant from the image capturing apparatus 61, their luminances are different.

If the discrete depth data Ci is computed by division as it is computed in the second embodiment, the ratio of luminance of the subject 621 is X/Y, and the ratio of luminance of the subject 622 is also X/Y. Since the difference in reflective index is canceled, the ratio of luminance of a subject is equal to that of an equally distant subject.

In the case that a subject close to the image capturing apparatus includes a portion made of material of low reflectivity, the difference in luminance of the portion may be less than a predetermined threshold, and is determined to be distant from the image capturing apparatus, which is wrong. However, the ratio of luminance of the portion is greater than a predetermined threshold, and is determined to be close to the image capturing apparatus, which is correct.

Multi-level depth values may be computable by combining binary processing based on a plurality of images captured under different illumination conditions or binary processing using different thresholds in the same manner as the first embodiment.

Figure 7:
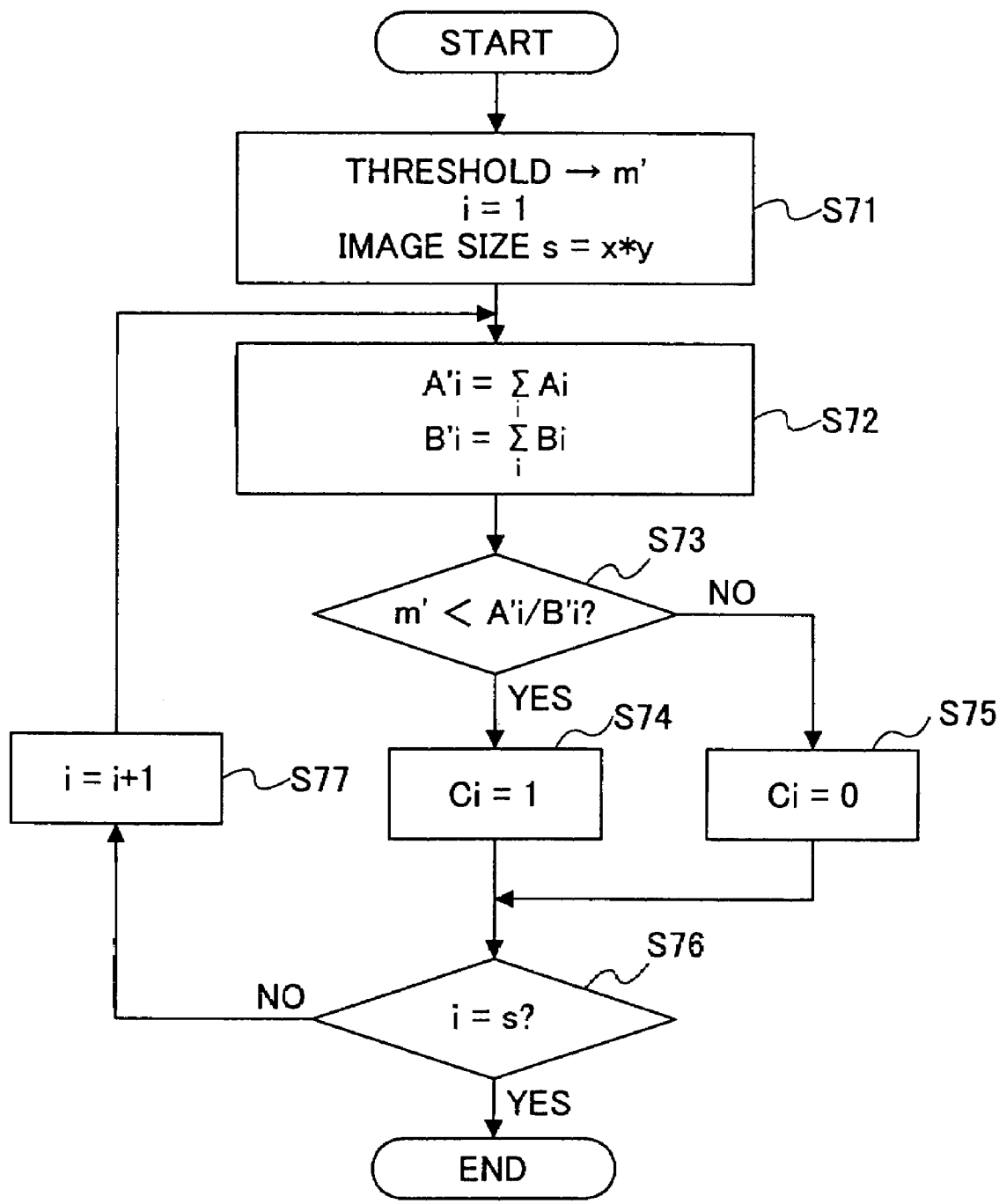
FIG. 7 is a flow chart showing the step shown in FIG. 5 in the case that average value is used.

FIG. 7 is a flow chart showing a variation of the step of generating the discrete depth data (step S27 in FIG. 2) described with reference to FIG. 5. The step of generating discrete depth data shown in FIG. 7 is different from the step of generating the discrete depth data shown in FIG. 5 in that, when the binary data Ci of a pixel i is computed, average values A'i and B'i of several pixels around the pixel i are used instead of the pixel values Ai and Bi, respectively. Since the average values are used, even if data of the plurality of images that are to be compared are deviated, the effect of the deviation can be reduced. If the range of pixels to be averaged is determined appropriately, the pseudo 3D image generating apparatus 10 according to this variation to the second embodiment is applicable to moving images too. Since S/N ratio is improved by averaging, the results of operations and comparisons become stable.

Figure 13:
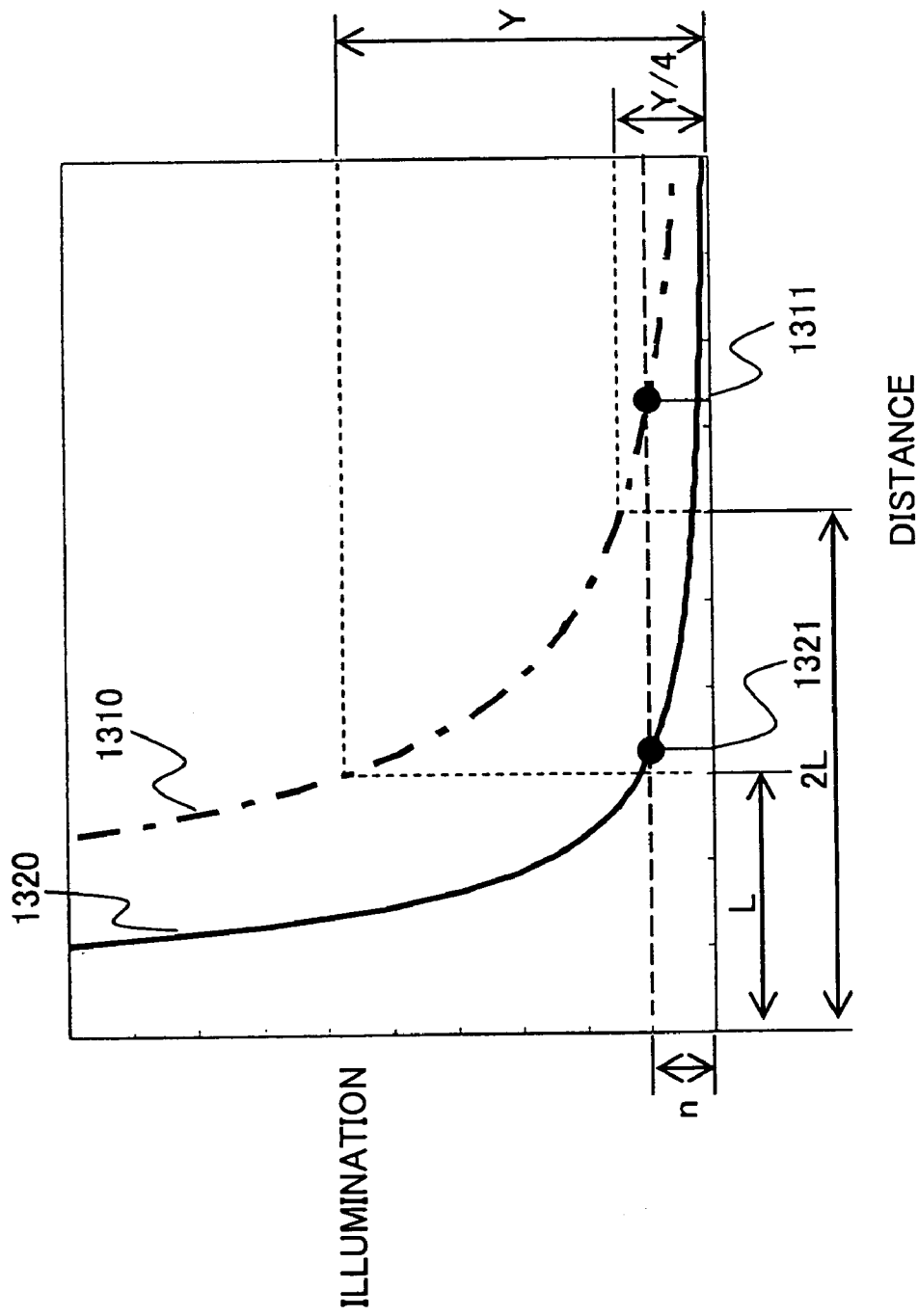
FIG. 13 is a graph for explaining the determination of a threshold for generating the discrete depth data according to the embodiments of the present invention.

A method of determining the thresholds used in the first and second embodiments is described with reference to FIG. 13. FIG. 13 is a graph showing the relationship between the distance and illumination of a subject. Curves 1310 and 1320 show the change of illumination of the subject over distance under illumination states of differing light intensity. The graph indicates that the light intensity that reaches the subject from the illuminating apparatus is inversely proportional to the square of distance.

In the case of the light intensity 1310, the light intensity that reaches a subject distant by 2L becomes Y/4, where Y is the light intensity that reaches a subject distant by L. A threshold n is shown in the graph. Pixels of which illumination is equal to or greater than the threshold n are closer to the image capturing apparatus than a distance denoted by a reference numeral 1311. Likewise, in the case of the light intensity 1320, pixels of which illumination is equal to or greater than the threshold n are closer to the image capturing apparatus than a distance denoted by a reference numeral 1321. Accordingly, if the discrete depth data are determined based on the subtraction of pixel values as they are determined in the first embodiment, a threshold corresponding to a distance can be determined depending on the illumination light intensity. In this case, however, it is necessary to appropriately assume the reflective index of subjects. The effect of outdoor daylight (corresponding to the illumination condition without the illumination by the illuminating apparatus) does not need to be taken into account since it is canceled when the subtraction is performed. A more appropriate threshold is determinable by adjusting the assumed reflective index based on the generated discrete depth data.

On the other hand, if the discrete depth data are determined based on the division of pixel values as they are determined in the second embodiment, the threshold corresponding to a distance can be determined based on the light intensity projected by the illuminating apparatus and the outdoor daylight (or the indoor lighting, for example).

The outdoor daylight, for example, if it is constant, increases the minimum value of the illumination shown in FIG. 13 by providing a constant offset. The relative distance of the subject is determinable by the division. For example, since the illumination light intensity decreases inversely proportional to the square of distance, if the result of division of a pixel is four times as great as the result of division of another pixel, the pixel is half as distant from the image capturing apparatus as the other pixel is.

Assuming that the outdoor sunlight projected to the subject is constant, one can determine the threshold corresponding to a distance. In this case, the effect of difference in reflective index of the subject does not need to be taken into account since it is canceled by the division.

A more appropriate threshold is determinable by adjusting the assumed illumination light intensity based on the generated discrete depth data.

Third Embodiment

A third embodiment of the present invention is described below. The pseudo 3D image generating apparatus and the method of generating a pseudo 3D image according to the third embodiment are identical to those of the first embodiment except for the process of generating discrete depth data. Accordingly, only the difference is described below.

Figure 8:
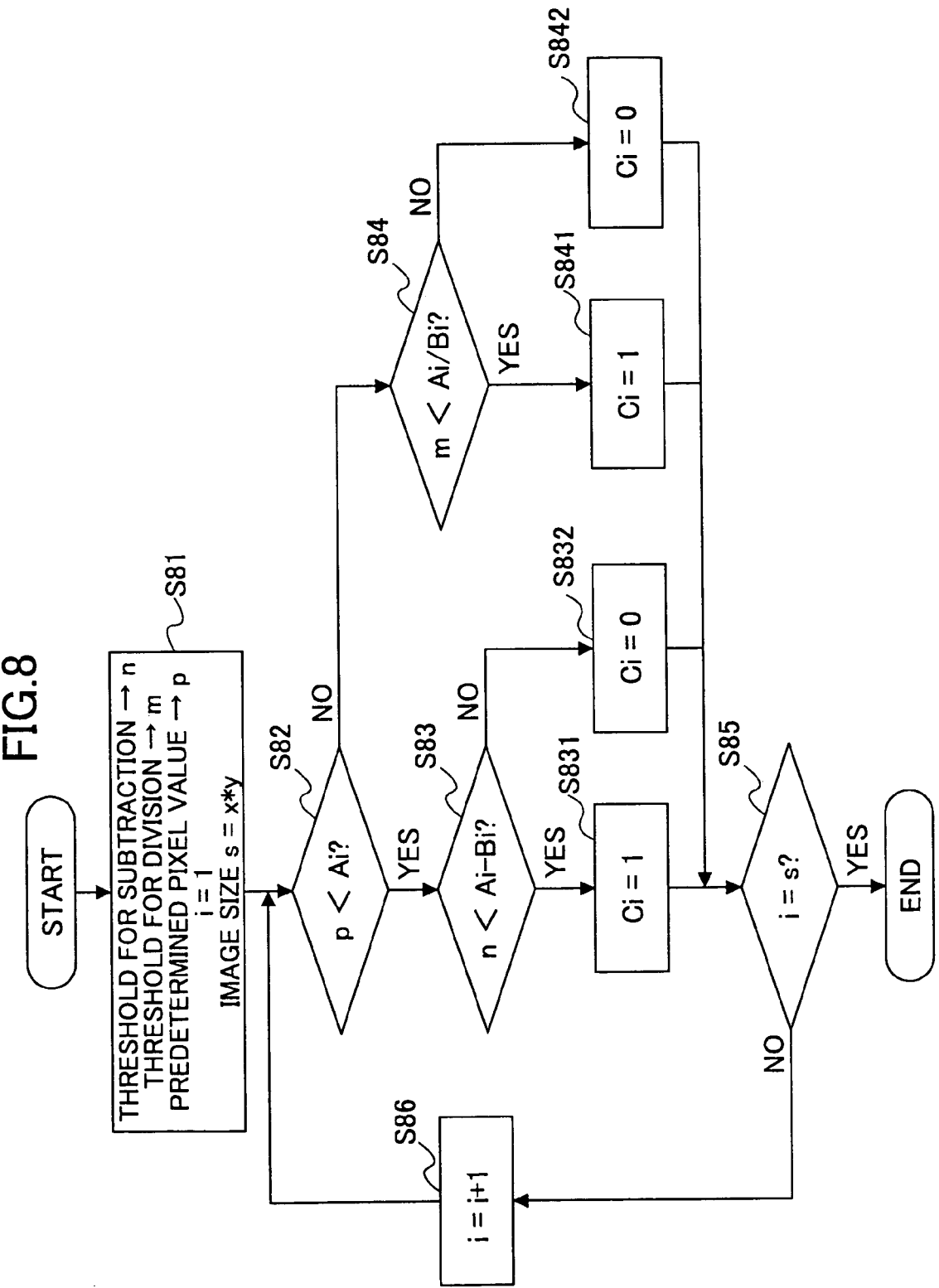
FIG. 8 is a flow chart showing a step of generating discrete depth data according to a third embodiment of the present invention.

FIG. 8 is a flow chart showing a process of generating discrete depth data according to the third embodiment. The depth value is assumed to be binary data indicating "close" and "distant" as in the second embodiment. The pixel value of the i-th pixel of image data "with illumination" is denoted as Ai, the pixel value of the i-th pixel of image data "without illumination" is denoted as Bi, and binary data qualitatively indicating discrete depth is denoted as Ci.

When computing depth value, a threshold n for subtraction, a threshold m for division, a predetermined pixel value p, and image size s are determined first (step S81). The threshold n for subtraction, the threshold m for division, and the predetermined pixel value p are parameters for assigning binary discrete depth data to an image. These parameters are arbitrarily determinable. The image size s is the number of pixels in the width direction (x) multiplied by the number of pixels in the height direction (y) of input image data. If the pixel value Ai is equal to or greater than the predetermined pixel value p, the discrete depth data are generated through the process of generating discrete depth data using the threshold n, the process described in connection with the first embodiment. Otherwise, the discrete depth data are generated through the process of generating discrete depth data using the threshold m, the process described in connection with the second embodiment. Collectively the two processes are shown in steps S82-S86 in FIG. 8.

Pixels of which binary data Ci is 1 are determined to be close to the image capturing apparatus 11, and the other pixels are determined to be distant from the image capturing apparatus 11.

As described above, the discrete depth data computed by subtraction are assigned as the pseudo distance to pixels of which luminance is equal to or higher than the predetermined pixel value p. In this case, since the computational load is low, the pseudo 3D image generating apparatus according to the third embodiment can generate the pseudo 3D image at high speed. The discrete depth data computed by division, however, are assigned as the pseudo distance to pixels of which luminance is lower than the predetermined pixel value p. In this case, if the luminance of a portion of the image data is lower than the predetermined pixel value due to a low reflective index, the discrete depth data computed by division indicates the actual distance more accurately.

Multi-level depth values may be computable by combining binary processing based on a plurality of images captured under different illumination conditions or binary processing using different thresholds in the same manner as the first embodiment.

Figure 9:
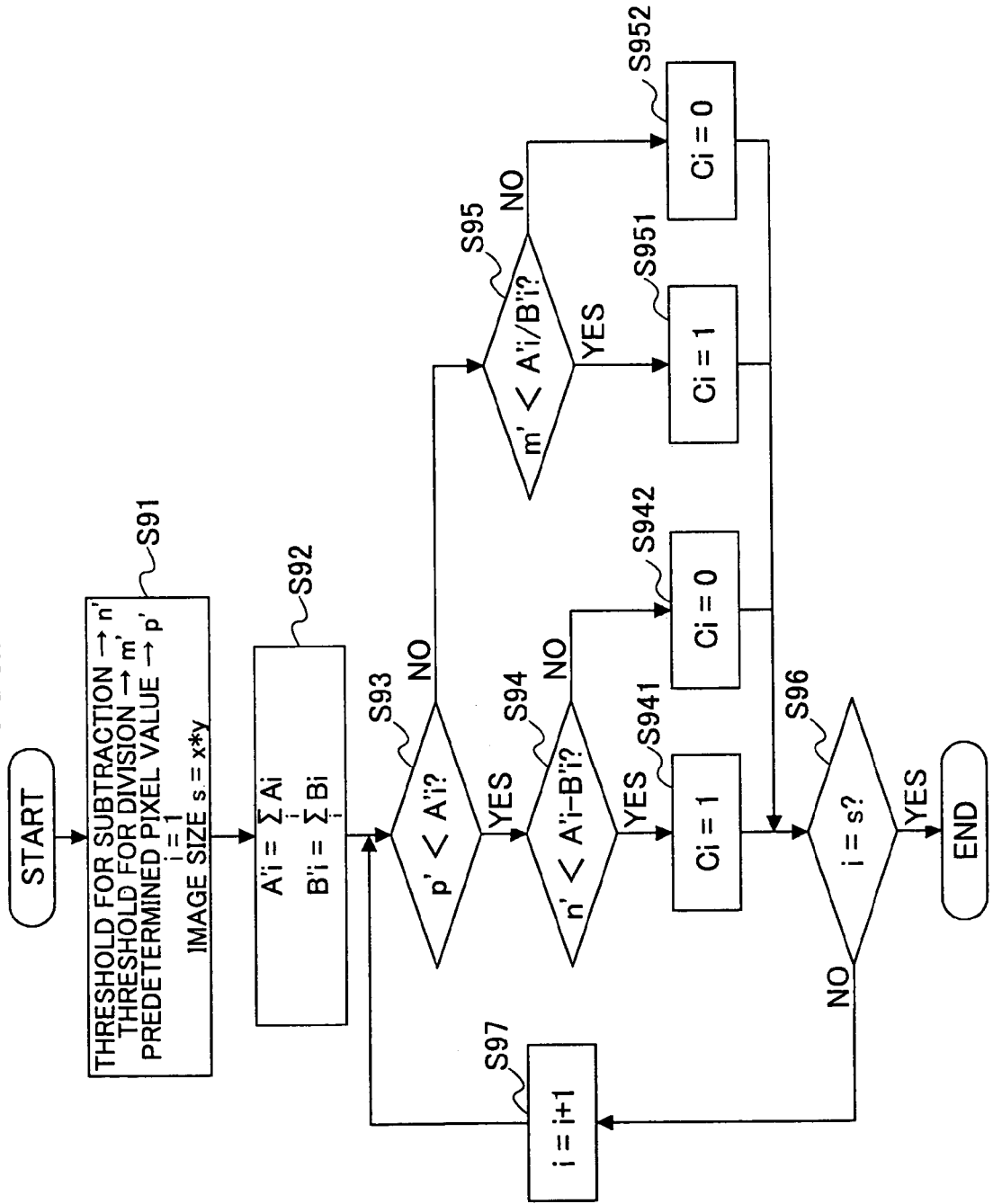
FIG. 9 is a flow chart showing the step shown in FIG. 8 in the case that average value is used.

FIG. 9 is a flow chart showing a variation of the step of generating the discrete depth data (step S27 in FIG. 2) described with reference to FIG. 8. The step of generating discrete depth data shown in FIG. 9 is different from the step of generating the discrete depth data shown in FIG. 8 in that, when the binary data Ci of a pixel i is computed, average values A'i and B'i of several pixels around the pixel i are used instead of the pixel values Ai and Bi, respectively. Since the average values are used, even if data of the plurality of images that are to be compared are deviated, the effect of the deviation can be reduced. If the range of pixels to be averaged is determined appropriately, the pseudo 3D image generating apparatus 10 according to the second embodiment is applicable to moving images too. Since S/N ratio is improved by averaging, the results of operations and comparisons become stable.

According to a variation of the third embodiment, a plurality of predetermined pixel values p1, p2, . . . , may be used. In the case that two predetermined pixel values p1 and p2 are used, for example, where p1>p2, if a pixel value is greater than p1, a threshold n1 is used for the subtraction operation. If the pixel value is greater than p2, another threshold n2 is used for the subtraction operation. If the pixel value is equal to or smaller than p2, yet another threshold n3 is used for the subtraction operation. The different thresholds may be used depending on the pixel value. The thresholds may be determined region by region as they are determined in the case of adaptive binarization.

Fourth Embodiment

As described above, discrete depth data are generated (step S27 of FIG. 2) and the discrete depth data are used as the depth of a pseudo 3D image, as is, in the first through third embodiments. Specifically, a predetermined distance (depth) of close subjects and a predetermined distance (depth) of distant subjects are assigned to the value of Ci, that is, 1 and 0. According to the fourth embodiment of the present invention, the generated discrete distance data are further processed so that a pseudo 3D image makes observers perceive more reality (step S28 of FIG. 2).

Figure 10:
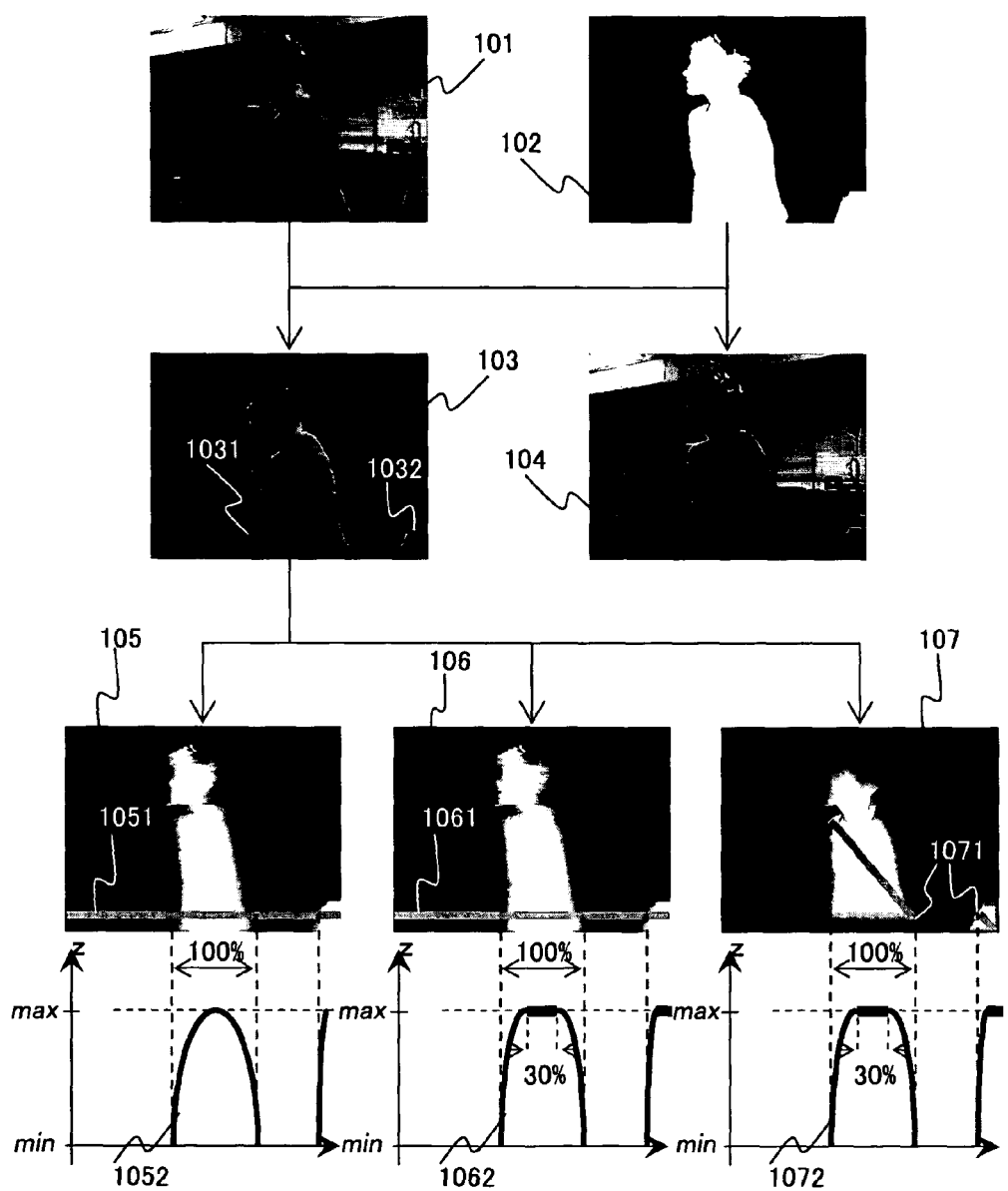
FIG. 10 contains images and graphs for explaining processing for fitting a continuous function to a pseudo three dimensional image according to a fourth embodiment of the present invention.

FIG. 10 shows images for explaining a method of generating a pseudo 3D image according to the fourth embodiment of the present invention. The algorithm of the method is described below with reference to FIG. 10.

An original image 101 is divided based on the discrete depth data generated according to any one of the first through third embodiments. Since the discrete depth data Ci is binary data, a discrete depth data image 102 is a two dimensional black-and-white image indicating Ci. The original image 101 can be divided based on the discrete depth data image 102 into two images, that is, a foreground image 103 and a background image 104. The discrete depth data image 102 can be generated by any method such as the methods according to the first through third embodiments.

Objects are extracted from the foreground image 103 by classifying regions. The black portion in the foreground image 103 is a region existing on another divisional image (that is, the background image 104). Partial images 1031, 1032 in which adjacent pixels remaining in the foreground image 103 are grouped are so called objects corresponding to the subjects. In this case, the objects are extracted by grouping together adjacent remaining pixel. The objects may be extracted by dividing the original image 101 based on color information. The depth values of the objects 1031 and 1032 in the foreground image 103 are re-computed so that the depth values of the objects 1031 and 1032 are smoothly connected to the depth values of the background image 104. Specifically, the edges of the objects 1031 and 1032 that steeply rise from or fall to the background image 104 are replaced with appropriately determined smooth functions.

Three examples are illustrated in FIG. 10. An image 105 shows the case in which the depth value of the objects is replaced with a quadratic function that changes in the width directions of the objects. An image 106 shows the case in which the depth value of the objects is replaced with a function of which center portion is constant and each shoulder portion is a quadratic function that changes in the width directions. An image 107 shows the case in which the depth value of the center portion of each object is constant and the depth value of the peripheral portion of each object is replaced with a quadratic function that changes along lines extending spokewise from the center of gravity of each object.

When generating the image 105 in which the depth value of the objects is replaced with a quadratic function that changes in the width directions of the objects, the objects are scanned horizontally, and pseudo depth values computed based on the quadratic function are provided to each pixel on the scan line. For example, when a line 1051 is scanned, the left and right edges of the object on the line 1051 are detected. The depth value of the background image 104 is set as the minimum, and the greatest depth value of the foreground image 103 that is most distant from the background image 104 is set as the maximum. The depth values of the objects are replaced with values of a quadratic function that crosses the minimum at the left and right edges of the object and the maximum at the center of the object. It is possible to compute pseudo depth of a captured 2D image and generate a pseudo 3D image without measuring actual depths of subjects.

When generating the image 106 in which the depth value of the objects is replaced with a function of which center portion is constant and each shoulder portion is a quadratic function, the objects are scanned horizontally, and pseudo depth values are assigned to each pixel. For example, when a line 1061 is scanned, the left and right edges of the object on the line 1061 are detected. The depth value of the background image 104 is set as the minimum, and the greatest depth value of the foreground image 103 that is most distant from the background image 104 is set as the maximum. The depth value of the object 1031 is replaced with a function 1062. The function 1062 is a composite function including a quadratic function that crosses the minimum at the left (right) edge of the object 1031 and the maximum at a position 15% left (right) from the center of the object 1031, and a linear function that is constant at the maximum in the center range of 30%. Since the center portion of the object is emphasized, observers watching the image 106 perceive that the object 1031 is closer to themselves than when they are watching the image 105.

When generating the image 107 in which the depth value of the center portion of each object 1031 and 1032 is constant and the depth value of the peripheral portion of each object is replaced with a quadratic function that changes along lines extending spokewise from the center of gravity of each object, the center of gravity of the object 1031 is computed, and pseudo depth values are provided for each line that crosses the computed center of gravity and an edge of the object 1031. For example, when the depth values on a line 1071 are computed, the crossing point of the edge of the object 1031 and the line 1071 are detected. The depth value of the background image 104 is set as the minimum, and the greatest depth value of the foreground image 103 that is most distant from the background image 104 is set as the maximum. The depth values are replaced with the values of a function 1072. The function 1072 is a function that crosses the minimum at the crossing points and is constant at the maximum in the 30% range between the crossing points centered on the center of gravity.

Since the center portion of the object is emphasized, observers watching the image 107 perceive that the object 1031 is closer to themselves than when they are watching the image 105. Because the depth values are computed along lines extending spokewise from the center of gravity of the object, the edge of the object is uniformly smoothed despite the slope of the boundary of the object. Observers watching the image 107 perceive that the pseudo 3D image is more natural than they do when watching the image 106.

Fifth Embodiment

Figure 11A:
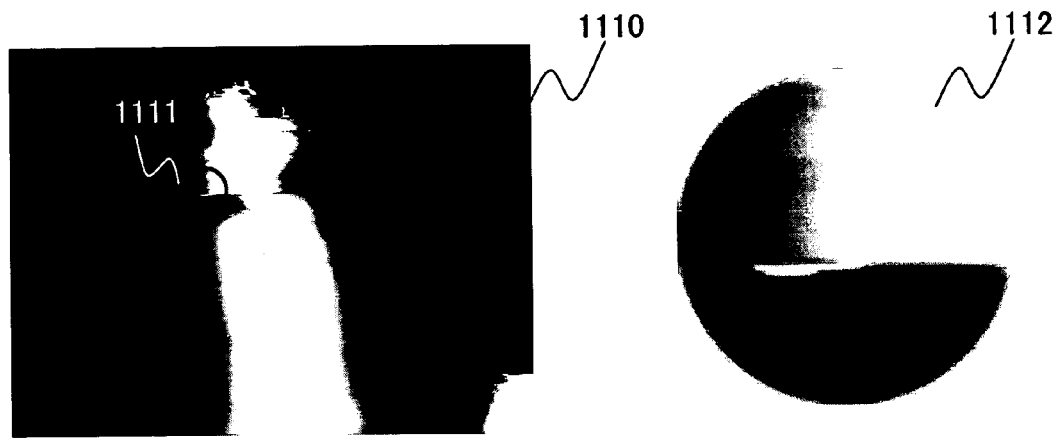
FIG. 11 is a set of images for explaining processing for smoothing a pseudo depth image according to a fifth embodiment of the present invention.
Figure 11B:
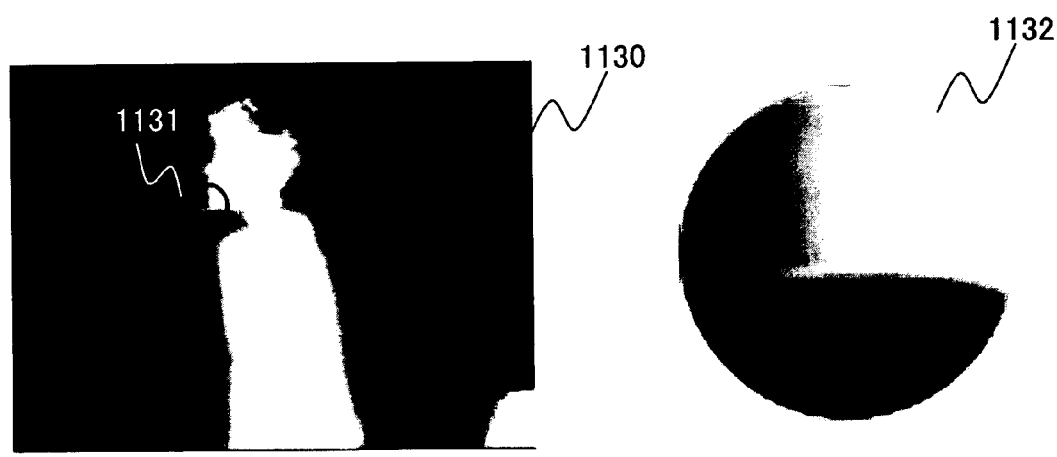

FIGS. 11A and 11B show images for explaining a method of generating a pseudo 3D image according to a fifth embodiment of the present invention. FIG. 11A shows the original depth values 1110 of pixels of a divisional image computed by the method of generating a pseudo 3D image according to the fourth embodiment. FIG. 11B shows depth values 1130 after smoothing in which a 7×7 pixel range centered on each pixel is averaged.

FIG. 12 illustrates the smoothing filter used for smoothing according to the fifth embodiment. In this case, the smoothing filter applied to the depth values 1110 is a simple moving average filter in which the pixel values of all pixels in the filter size (7×7), at which center is the pixel to be processed, are multiplied by a multiplicative inverse (1/49) of the filter size and then are summed. The filter size is arbitrarily changeable. It is possible to use another filter for smoothing such as a weighted moving average filter of which each matrix in the filter is appropriately weighted and a Gaussian filter of which each matrix in the filter is weighted in accordance with a Gaussian distribution.

An enlarged image 1112 of FIG. 11A shows a portion around the jaw of the original depth values 1110. Another enlarged image 1132 of FIG. 11B shows the portion 1131 around the jaw of the smoothed depth values 1130. It is apparent from the comparison between the enlarged images 1112 and 1132 that smoothing processing reduces steep change in the depth values.

If there is a steep change in the depth values of an object that is generated by the method of generating a pseudo 3D image according to the first through fourth embodiments, observers watching the pseudo 3D image may feel uneasy about it. If there is a steep change in the depth values in a boundary portion of an object, since the object looks apart from other adjacent divisional images, observers watching the pseudo 3D image may feel uneasy about it too.

In the case where there is a steep change in the depth values in an object, smoothing the computed depth values prevents the observers from feeling uneasy about the pseudo 3D image. Further, in the case where there is a steep change in the depth values in a boundary portion of an object, smoothing makes the connection between the depth values of the object and the depth values of adjacent divisional images smooth, and prevents the observers from feeling uneasy about the pseudo 3D image.

It is obvious that a duly designed computer program can cause a computer to perform the steps shown in the above flow charts. It is also obvious that such a computer program can be stored in a computer readable recording medium.

According to the first through fifth embodiments, a subject of which image is captured is extracted from the captured image as an object based on the discrete depth data. Pseudo depth values are assigned to the pixels included in the extracted object. According to another embodiment of the present invention, the object may be extracted by conventional methods such as edge detection and/or color information. Pseudo depth values may be assigned to the pixels included in the object extracted with the conventional methods based on the discrete depth data according to the present invention. The edge detection may be performed by a first derivation filter and a second derivation filter, for example. An object may be extracted using the color space and color intensity.

Figure 14:
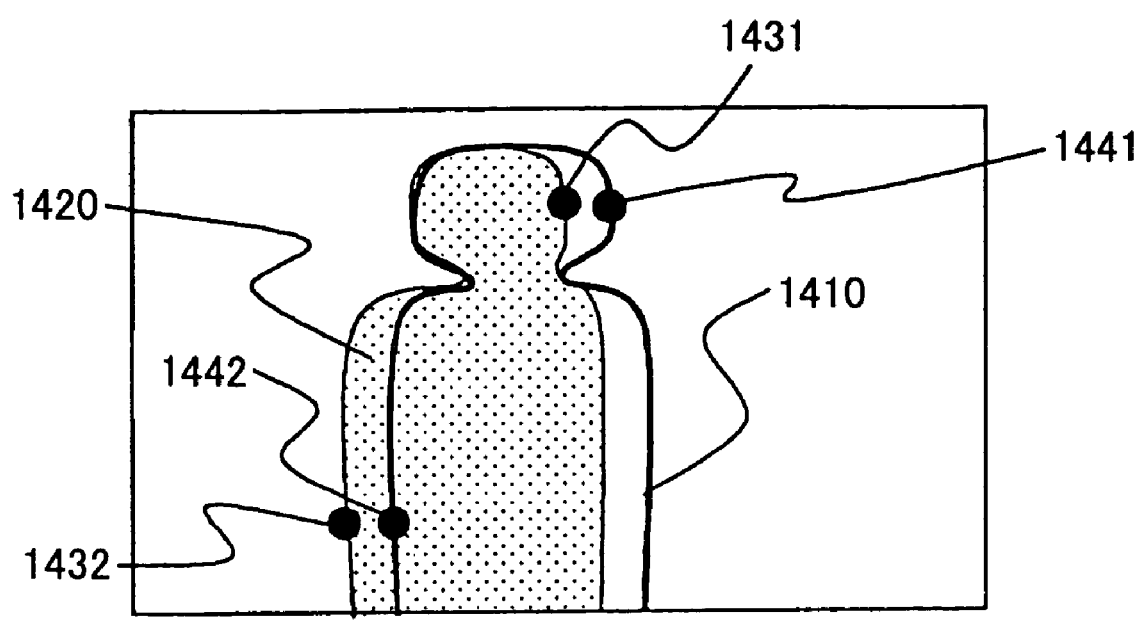
FIG. 14 is a schematic diagram for explaining the adjustment of an object according to the embodiments of the present invention.

An object extracted based on discrete depth data may be adjusted using an object extracted by edge detection and/or color information. FIG. 14 is a schematic diagram for explaining the adjustment of an object. A reference numeral 1410 denotes the contour of an object extracted by edge detection, for example. A reference numeral 1420 denotes a region extracted based on discrete depth data. A discrete depth data image may be deviated from a true image that reflects actual depth of the object due to the difference in reflective index of the object and/or movement of the object. The deviation is adjusted using the contour 1410. Specifically, the contour of the region 1420 extracted based on the discrete depth data is adjusted to the nearest portion of the contour 1410. For example, a point 1431 is adjusted to a point 1441, and a point 1432 is adjusted to a point 1442.

Not only the contour but also the discrete depth data image is adjustable by removing a small region and/or filling up a small hole in the discrete depth data image. For example, if a portion of a subject (eyes of a person and buttons, for example) is not captured as the object, the portion may be filled up. If a portion that is not included in the subject is captured as the object, the portion may be removed. The size of the portion to be filled up or removed may be determined based on a rule of thumb. Likewise, if the gap between two objects is small, the gap may be filled up thereby to combine the two objects. The gap size may be determined based on a rule of thumb in the same manner as the size of a portion to be filled up or removed.

The resolution of images may be reduced in order to reduce computational load before generating the discrete depth data. The amount of computation can be reduced by reducing the resolution of the images. If an extracted object is deviated due to the effect of reflective index and the movement of a subject, the resolution of the depth values become coarse compared to texture. Accordingly, the contour of the discrete depth data image deviating from a true image is made obscure, and the deviation looks smaller.

If the resolution of the averaged image is reduced, the S/N ratio of the averaged image can be improved as the image is smoothed by a smoothing filter.

The signal S indicates infinite grey scale image information captured without any noise. The noise N indicates the amount of noise including all noise factors such as optical and electrical noise and quantization noise caused by quantization error.

Only pixels that remain after the reduction of resolution need to be averaged. For example, if every other pixel is averaged in the width directions and the height directions, the number of pixels to be averaged may be reduced down to ¼ of number before the resolution reduction. Generating the discrete depth data using divisional operation according to the second embodiment is highly sensitive to noise in the image. Even in this case, the S/N ratio can be improved by reducing the resolution of the image.

Not all of the above processing necessarily needs to be performed, but only desired processing may be performed on a necessity basis in response to the instruction of the control unit 15.

As described above, the present invention provides the following effects.

Since the image capturing apparatus and the illuminating apparatus may be disposed adjacent to each other, a pseudo 3D image generating apparatus according to an aspect of the present invention can be made more compact than a conventional apparatus.

If the result of a simple binarization process is used as the pseudo distance, because computational load is small, a pseudo 3D image generating apparatus according to another aspect of the present invention can generate a pseudo 3D image at high speed.

A pseudo 3D image generating apparatus according to yet another aspect of the present invention can easily generate continuous pseudo depth values without any complex measurement.

A pseudo 3D image generating apparatus according to yet another aspect of the present invention can reduce uneasy feelings of observers caused by a steep change in the computed pseudo depth values.

The present invention is not limited to these embodiments, but various variations and modifications may be made without departing from the scope of the present invention.

This patent application is based on Japanese priority patent application No. 2002-275471 filed on Sep. 20, 2002, the entire contents of which are hereby incorporated by reference.

What is claimed is:

1. A pseudo 3D image generating apparatus that generates a pseudo three dimensional image of a subject from at least two images captured in different illumination conditions of the subject, comprising:
   an image storing unit that stores the at least two images of the subject captured in the different illumination conditions; and
   a depth computing unit that computes a pseudo depth value for each pair of corresponding pixels of the at least two images of the subject, based on an operation between pixel values of the corresponding pixels, thereby to form the pseudo three dimensional image of the subject;
   wherein
      the different illumination conditions in which the at least two images of the subject are captured are generated by means of a single light source; and
      at least two different pseudo depth values are given to the pairs of the corresponding pixels of the at least two images of the subject.

2. The pseudo 3D image generating apparatus as claimed in claim 1, wherein
   said depth computing unit reduces the resolution of the at least two images to form resolution-reduced images, and computes the pseudo depth value for the corresponding pixels based on an operation between the pixel values of the corresponding pixels of the resolution-reduced images.

3. The pseudo 3D image generating apparatus as claimed in claim 2, wherein
   said depth computing unit smoothes the images before reducing the resolution of the at least two images.

4. The pseudo 3D image generating apparatus as claimed in claim 1, wherein
   said depth computing unit assigns a discrete depth value to each pair of corresponding pixels of the at least two images of the subject by comparing at least one of the difference and the ratio between the pixel values of the corresponding pixels of the at least two images with a predetermined threshold value.

5. The pseudo 3D image generating apparatus as claimed in claim 1, further comprising an object extracting unit that extracts an object of the subject based on the pseudo depth values assigned to the corresponding pixels, the pseudo depth value being computed by said depth computing unit.

6. The pseudo 3D image generating apparatus as claimed in claim 5, wherein
   said depth computing unit assigns a discrete depth value to each pair of corresponding pixels of the at least two images of the subject by comparing at least one of the difference and the ratio between the pixel values of the corresponding pixels of the at least two images with a predetermined threshold value; and
   said object extracting unit extracts adjacent pixels of one of the images as the object, the assigned discrete depth values of the adjacent pixels being equal to each other.

7. The pseudo 3D image generating apparatus as claimed in claim 6, wherein
   said depth computing unit smoothes the discrete depth values of the pixels in a predetermined range in one of the entire image, the peripheral portion of the object, and the object.

8. The pseudo 3D image generating apparatus as claimed in claim 1, wherein
   said depth computing unit fits a continuous depth function to the object based on the discrete depth values.

9. A method of generating a pseudo 3D image of a subject from at least two images captured in different illumination conditions of the subject, the method comprising the steps of:
   capturing the at least two images of the subject in the different illumination conditions generated by means of a single light source;
   storing the images; and
   computing a pseudo depth value for each pair of corresponding pixels of the at least two images of the subject, based on an operation between pixel values of the corresponding pixels, thereto to form the pseudo three dimensional image of the subject, wherein
   at least two different pseudo depth values are given to the pairs of the corresponding pixels of the at least two images of the subject.

10. The method as claimed in claim 9, wherein the step of computing a pseudo depth value further comprises the steps of:
    reducing the resolution of the at least two images to form resolution-reduced images; and
    computing the pseudo depth value for the corresponding pixels based on an operation between the pixel values of the corresponding pixels of the resolution-reduced images.

11. The method as claimed in claim 10, wherein the images are smoothed before the resolution of the at least two images is reduced.

12. The method as claimed in claim 9, wherein a discrete depth value is assigned to each pair of corresponding pixels of the at least two images of the subject by comparing at least one of the difference and the ratio between the pixel values of the corresponding pixels of the at least two images with a predetermined threshold value.

13. The method as claimed in claim 9, further comprising the step of extracting an object of the subject based on the pseudo depth values assigned to the corresponding pixels.

14. The method as claimed in claim 13, wherein
    a discrete depth value is assigned to each pixel by comparing one of the difference and the ratio between the pixel values of the corresponding pixels with a threshold value predetermined for each pixel in the step of computing the depth value; and adjacent pixels of one of the images are extracted as an object in the step of extracting the object, the assigned discrete depth values of the adjacent pixels being equal to each other.

15. The method as claimed in claim 14, further comprising the step of smoothing the discrete depth values of the pixels in a predetermined range in one of the entire image, the peripheral portion of the object, and the object.

16. The method as claimed in claim 9, further comprising the step of fitting a continuous depth function to the object based on the computed discrete depth values.

17. A computer readable recording medium storing a computer program that causes a computer to generate a pseudo 3D image of a subject from at least two images captured in different illumination conditions of the subject, said computer program comprising the steps of:

capturing the at least two images of the subject in the different illumination conditions generated by means of a single light source;

storing the images; and computing a pseudo depth value for each pair of corresponding pixels of the at least two images of the subject, based on an operation between pixel values of the corresponding pixels, thereby to form the pseudo three dimensional images of the subject, wherein at least two different pseudo depth values are given to the pairs of the corresponding pixels of the at least two images of the subject.

* * * * *